Adams & Warfield.
Dusting Brush.
No 2903 Reissued Mar. 31, 1868.
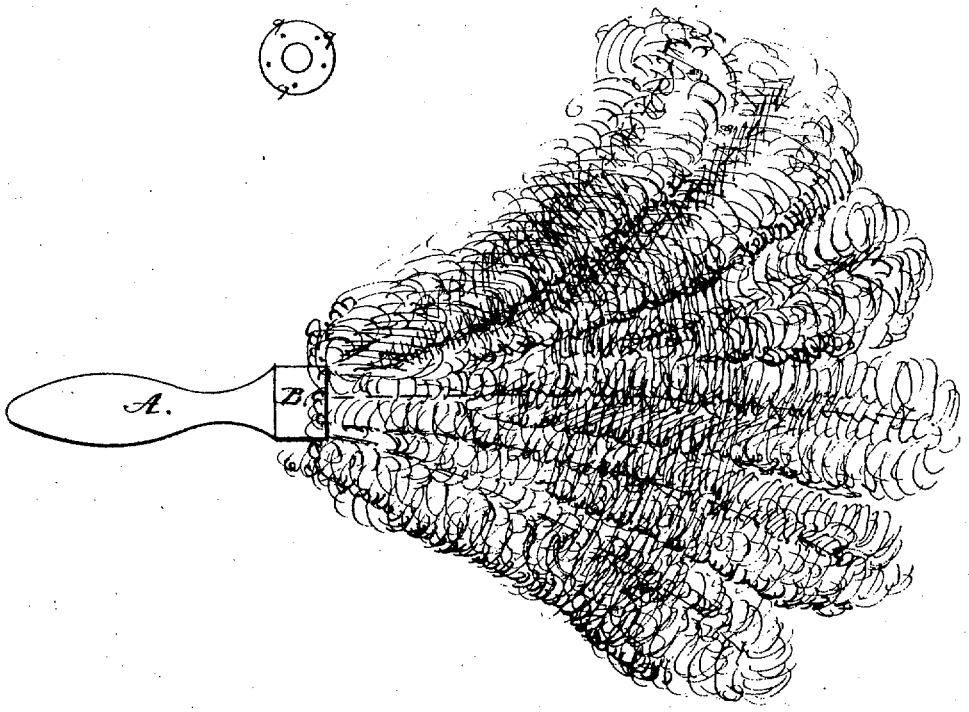
Witnesses;
Wm H Bradbury
A W Chapin
J. O. Adams
E A Warfield
by his attys
Gardner & Hyde

United States Patent Office.

J. O. ADAMS AND E. A. WARFIELD, OF NORTHAMPTON, MASSACHUSETTS, ASSIGNEES OF ROBERT H. ALDRICH, OF THE SAME PLACE.

*Letters Patent No.* 62,724, *dated March* 12, 1867; *reissue No.* 2,903, *dated March* 31, 1868.

IMPROVED DUSTING-BRUSH.

The Schedule referred to in these Letters Patent and making part of the same.

TO ALL WHOM IT MAY CONCERN:

Be it known that ROBERT H. ALDRICH, of Northampton, Hampshire county, Commonwealth of Massachusetts, invented a new and useful Improved Duster; and we do hereby declare that the following is a full and clear description thereof, reference being had to the accompanying drawings, and to the letters of reference marked thereon. In the drawings—

Figure 1 is a side view of my duster.

Figure 2, a detailed view of a part of the same.

This invention consists of a duster, such as is used in ordinary household work, formed of sheep's wool, instead of the usual materials, such as feathers, worsted, thread, &c., which are much more costly.

In order to effect this, we use a handle, A, composed of wood or other suitable material for the purpose, and having its front end, B, of sufficient circumference and sectional surface to allow a number of wires, *a a a a*, &c., to be set in. These wires are curved so as to resemble in shape the stems of feathers, and are indicated in the drawings by the dotted lines. In order to attach the woolly fibre to these, we cut a number of strips from an ordinary sheep-skin with the wool on, and stitch them up so as to form long narrow bags, with the wool on the outside. These are passed over the wires, being open at one end, and conform to the shape of the wires, making a plume, which, when dyed in tasteful colors, presents a neat and ornamental appearance. In the centre of the end, B, of the handle A, is a projection, C, of wood or other substance, forming a centre-piece, so that the ends of the plumes at the handle may be securely wrapped with wire or sheep-skin, binding the whole together firmly at that point.

The advantages of this device, as heretofore stated, are, its comparative cheapness, and also durability and convenience of manufacture, it in no way falling behind other devices of the sort in tastefulness of appearance. It is not necessary to the substance of this invention that the duster should consist of a multiplicity of plumes. A single plume of this material and construction combines nearly all the advantages of the duster; but having described this invention,

What we claim as new, and desire to secure by Letters Patent, is—

A brush made of sheep-skin with the wool on, cut into strips, and fastened over one or more central cores, substantially as herein shown.

J. O. ADAMS,
E. A. WARFIELD.

Witnesses:
R. F. HYDE,
S. MORRIS POOL.